Oct. 25, 1938. W. G. BALZ 2,134,099
FISHING REEL
Filed Oct. 21, 1936
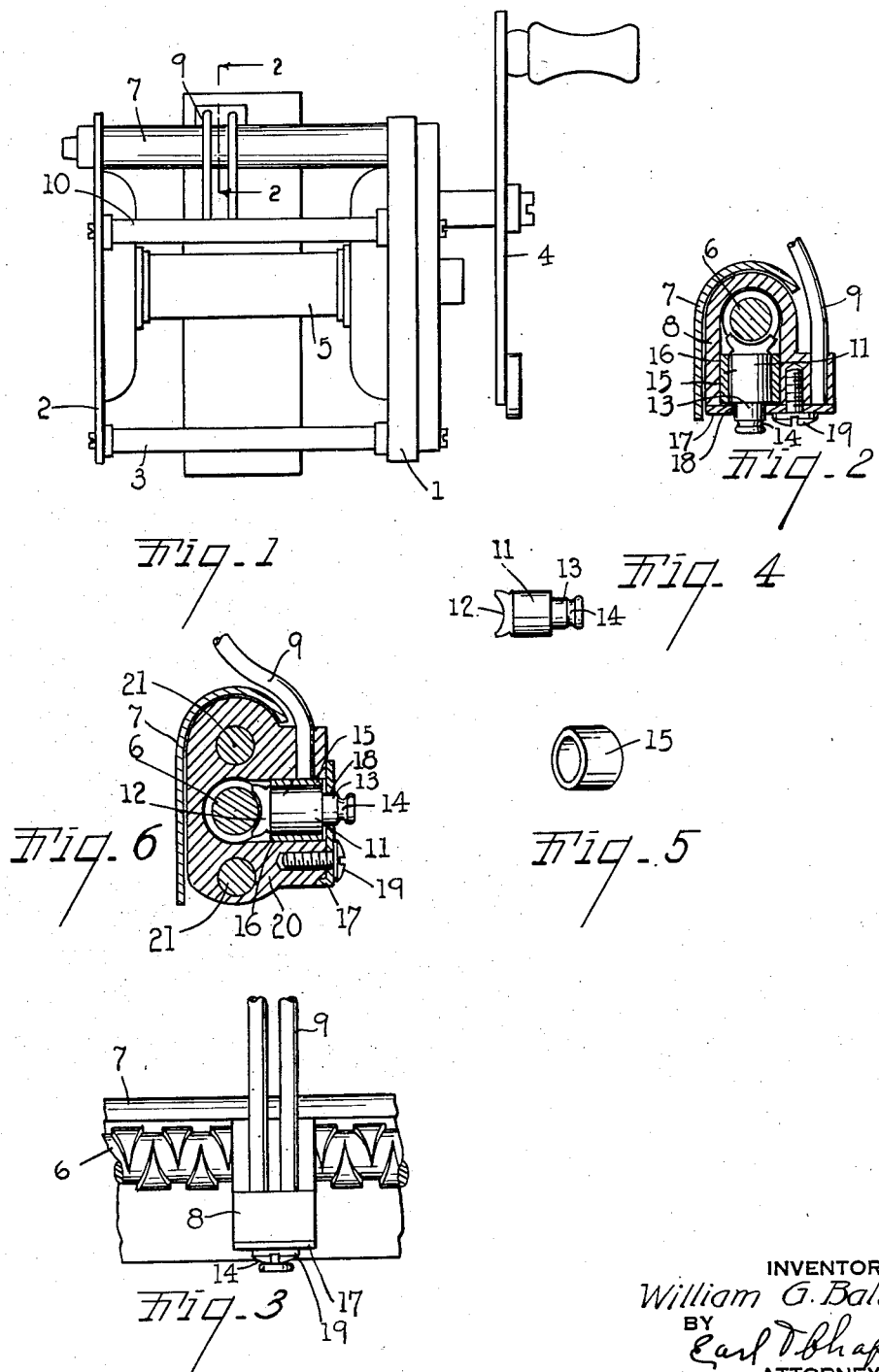
INVENTOR
William G. Balz
BY
Earl T. Chappell
ATTORNEYS Patented Oct. 25, 1938

2,134,099

UNITED STATES PATENT OFFICE 2,134,099

FISHING REEL

William G. Balz, Kalamazoo, Mich., assignor to Shakespeare Company, Kalamazoo, Mich.

Application October 21, 1936, Serial No. 106,738

3 Claims. (Cl. 242—84.4)

The main object of this invention is to provide a fishing reel of the level wind type having a reversely threaded traversing shaft with an improved pawl having the advantage of economy of structure and durability in use which does not become corroded or wedged in its bearing socket.

Objects relating to details and economies of the invention will appear from the description to follow. The invention is defined and pointed out in the claims.

A structure which is a preferred embodiment of the invention is illustrated in the accompanying drawing, in which:

Fig. 1 is a plan view of a fishing reel embodying the features of my invention.

Fig. 2 is an enlarged detail mainly in section on line 2—2 of Fig. 1.

Fig. 3 is an enlarged front fragmentary elevation looking from the right of Fig. 2.

Fig. 4 is a side view of one member of the pawl.

Fig. 5 is a perspective view of the pawl bushing or bearing sleeve.

Fig. 6 is a fragmentary view corresponding to that of Fig. 2 of a modified form or embodiment of my invention.

Referring to the drawing, the reel frame illustrated comprises the end members 1 and 2 connected by the pillars 3. The crank 4 is connected to the spool 5 by suitable gearing not illustrated.

The reversely threaded traversing shaft 6 also has driving connection with the crank directly or through the spool but as the details of this driving connection form no part of my present invention, they are not illustrated herein.

The traversing shaft is provided with a guard or housing 7 extending between the end members of the frame. The line guide carriage 8 is slidable on the traversing shaft 6 and carries the line guide 9 which is slidably associated with the pillar 10 to prevent rotative movement of the carriage relative to the traversing shaft.

The carriage has driving connection with the shaft through my improved pawl which comprises a cylindrical body member 11 preferably formed of hardened steel or hardened metal and having a shaft engaging tang or blade 12. At its outer end, this body member is provided with a reduced finger piece 13 having an annular groove 14 adjacent its outer end facilitating grasping to pull the pawl from the socket.

This steel or hardened metal body portion of the pawl is provided with a sleeve or bushing 15 of brass or other suitable non-ferrous or non-corrodible metal, the sleeve being preferably a pressed fit on the body portion so that the sleeve rotates in the cylindrical bore-like socket 16 although the body of the pawl might rotate in the sleeve or bushing. However, there are certain manufacturing and structural advantages in having the pawl and sleeve form an assembled unit, among them being the cleaning of the parts should occasion require, and also that if the pawl body portion and its shaft engaging tang or blade were withdrawn outwardly through the sleeve it would be necessary to materially shorten the tang or arc of the pawl which is not desirable.

The pawl is retained in operative relation to the traversing shaft by means of the clip 17 having a hole 18 therein receiving the reduced portion 13 of the pawl, this clip being detachably secured to the carriage by means of the screw 19.

In the embodiment of my invention shown in Fig. 6, the carriage 20 is slidable on the slide rods 21 which are arranged in parallel relation to the traversing shaft 6, otherwise the structure is substantially that described.

I have illustrated and described my improvements in embodiments which I have found highly satisfactory. I have not attempted to describe certain embodiments or adaptations which I contemplate to use with other forms of carriages as it is believed that these disclosures will enable those skilled in the art to embody or adapt my improvements as may be desired.

Having thus described my invention, what I claim as new and desire to secure by Letters Patent, is:

1. The combination with a reel having a reversely threaded line guide carriage traversing shaft, of a line guide carriage slidable on said shaft and having a pawl socket, a pawl disposed in said socket and comprising a hard metal cylindrical body portion provided with a shaft engaging tang at one end and a reduced axially disposed finger piece at the other end, a sleeve of non-ferrous metal on said cylindrical body portion of said pawl and constituting a sliding bearing surface for said pawl in the wall of said socket, and releasable pawl retaining means in supporting engagement with the outer end of the body portion of the pawl and having an opening for said finger piece permitting the oscillating movement of the pawl in its socket.

2. The combination with a reel having a reversely threaded line guide carriage traversing shaft, of a line guide carriage slidable on said shaft and having a pawl socket, a pawl disposed in said socket and comprising a cylindrical body portion provided with a shaft engaging tang, a sleeve of non-ferrous metal on said cylindrical body portion of said pawl and constituting a bearing surface for said pawl in the wall of said socket, and releasable pawl retaining means.

3. The combination with a reel having a reversely threaded line guide carriage traversing shaft, of a line guide carriage slidable on said shaft and having a cylindrical pawl socket, a pawl disposed in said socket and comprising a cylindrical steel body portion provided with a shaft engaging tang, a sleeve of non-corrodible metal having a pressed fit on said cylindrical body portion of said pawl and constituting a bearing surface for said pawl in the wall of said socket, and means for retaining said pawl.

WILLIAM G. BALZ.